United States Patent [19]

Loop

[11] Patent Number: 5,602,979
[45] Date of Patent: Feb. 11, 1997

[54] SYSTEM AND METHOD FOR GENERATING SMOOTH LOW DEGREE POLYNOMIAL SPLINE SURFACES OVER IRREGULAR MESHES

[75] Inventor: Charles Loop, Sunnyvale, Calif.

[73] Assignee: Apple Computer, Inc., Cupertino, Calif.

[21] Appl. No.: 573,583

[22] Filed: Dec. 15, 1995

Related U.S. Application Data

[63] Continuation of Ser. No. 113,617, Aug. 27, 1993, abandoned.

[51] Int. Cl.⁶ .................................................. G06T 17/00
[52] U.S. Cl. ........................................... 395/123; 395/141
[58] Field of Search ..................................... 395/119, 121, 395/123, 125, 128, 129, 130, 141

[56] References Cited

U.S. PATENT DOCUMENTS

| | | | |
|---|---|---|---|
| 4,912,664 | 3/1990 | Weiss et al. | 395/141 |
| 5,189,626 | 2/1993 | Colburn | 395/161 |

OTHER PUBLICATIONS

Foley et al, "Computer Graphics Principles and Practice", 1990, pp. 516–529.

E. Catmull and J. Clark, "Recursively generated B–spline surfaces on arbitrary topological meshes," Computer Aided Design, 1978, pp. 350–355.

H. Chiyokura and F. Kimura, "Design of solids with free–form surfaces," Computer Graphics, 1983, pp. 289–298.

C. Chui and M. J. Lai, "Algorithms for generating B–nets and graphically displaying spline surfaces on three– and four–directional meshes," Computer Aided Geometric Design, 1991, pp. 479–493.

D. Doo, "A subdivision algorithm for smoothing down irregularly shaped polyhedrons," In Proceedings on Interactive Techniques in Computer Aided Design, 1978, pp. 157–165.

D. Doo and M. Sabin, "Behaviour of recursive division surfaces near extraordinary points," Computer Aided Design, 1978, pp. 356–360.

S. L. Lee and A. A. Majid, "Closed smooth piecewise bicubic surfaces, "ACM Transactions on Graphics, 1991, pp. 342–365.

J. van Wijk, "Bicubic patches for approximating non–rectangular control–point meshes," Computer Aided Geometric Design, 1986, pp. 1–13.

M. A. Watkins, "Problems in geometric continuity," Computer Aided Design, 1988, pp. 1–4.

T. N. T. Goodman, "Closed biquadratic surfaces," Constructive Approximation, 1991, pp. 149–160.

Jorg Peters, "Smooth Free–Form Surfaces Built From Quadratic Box Splines And Their Cubic Genralization," Sep. 22, 1992, pp 1–15.

(List continued on next page.)

Primary Examiner—Mark K. Zimmerman
Attorney, Agent, or Firm—Greg T. Sueoka; Christopher M. Tobin

[57] ABSTRACT

A system and method for modeling smooth free-form shapes using B-splines over irregular meshes, in a simple and efficient manner, to generate a display of aesthetically pleasing shapes is disclosed. A low degree parametric polynomial representation is generated. As a result, techniques for surface-surface or ray-surface intersection are faster and more robust than possible with existing techniques. In accordance with the present invention, an input mesh $M^0$ is initially simplified by isolating irregularities and constraining geometry. First, the input mesh $M^0$ is subjected to general refinement, whereby a new mesh $M^1$ is constructed, which in turn is subjected to constrained refinement, whereby another new mesh $M^2$ is constructed. After the general and constrained refinement steps, the mesh $M^2$ is broken up into a set of "quad-nets" corresponding to each of its vertices. Finally, these quad nets are used as local geometry, over which, 4 cubic Bézier triangles are constructed.

19 Claims, 6 Drawing Sheets

OTHER PUBLICATIONS

J. Peters, "Smooth Free–Form Surfaces Over Irregular Meshes Generalizing Quadratic Splines", Computer Aided Geometric Design, 1993, pp. 347–361.

J. Peters, "Smooth Mesh Interpolation With Cubic Patches", Computer Aided Design, 1990, pp. 109–120.

Wen–Hui Du and Francis J M Schmitt, "On The $G^1$ Continuity Of Piecewise Bezier Surfaces: A Review With New Results", Colmputer Aided Design, 1990, pp. 556–573.

M. Vasilescu and D. Terzopoulos, "Adaptive Meshes And Shells: Irregular Triangulation, Discontinuities And Hierarchical Subdivision", IEEE Computer Society Conference Proceedings, 1992, pp. 829–832.

Francis J M Schmitt, Brian A. Barsky and Wen–Hui Du, "An Adaptive Subdivision Method For Surface–Fitting From Sample Data", Computer Graphics, 1986, pp. 179–188.

SYSTEM AND METHOD FOR GENERATING SMOOTH LOW DEGREE POLYNOMIAL SPLINE SURFACES OVER IRREGULAR MESHES

RELATED APPLICATIONS

This is a continuation of Prior application Ser. No. 08/113,617 filed on Aug. 27, 1993 now abandoned.

BACKGROUND OF THE INVENTION

1. Field of the Invention

The present invention relates generally to the field of modeling smooth free-form shapes for computer graphics applications and the like. More particularly, the present invention relates to a system and method for generating smooth low degree polynomial spline surfaces over irregular meshes.

2. Description of Related Art

Geometric modeling has emerged as the primary technique used to describe the shape of an object or to simulate dynamic processes. Much of the power of contemporary geometric modeling resides in its techniques for synthesizing, and allowing easy description of complex shapes as arrangements of simpler ones. The importance of geometric modeling is rapidly increasing in many fields. It is a primary ingredient in computer-aided design (CAD) and computer-aided manufacturing (CAM) systems, computer graphics, computer art, animation, simulation, computer vision, and robotics. Advances in any of these fields depend on how well effective geometric models can be generated.

The construction of geometric models itself is usually a computer-aided operation, with the model stored in, and analyzed by, a computer. No longer limited to two-dimensional representations of physical objects, geometric modeling now topologically achieves and analytically completes three-dimensional models. Such models allow users to quickly and automatically derive any geometric property or attribute that the object is likely to possess.

Appearance not being the sole concern, careful distinctions between analytical models and rendering are drawn. Geometric modeling involves a mathematical setting that allows relationships between models to be calculated, for example, closest approach, intersections, shadowing, and so on. In many situations, arbitrary shapes must be represented, such as shapes that do not have special names and whose characteristics are not well defined.

Geometric modeling has three closely-related, yet distinct aspects, which are as follows: (1) representation, where the physical shape of an object is given and presumed to be fixed; (2) design, where a new shape is created to satisfy some operational or aesthetic objectives; and (3) rendering, where an image of the model is needed to visually interpret it.

A geometric-modeling system typically comprises the geometric-modeling software (including the model builder), a computer (anywhere from mainframe to micro), a user interface device (usually graphic), a data base for storing the model and a display generator for creating the graphic output, and usually an array of application programs.

Techniques for modeling, such as B-spline curves and Bézier curves, are effective interactive design tools currently used in industry. Some basic facts and formulas with respect to Bézier curves and surfaces are outlined below for background information. However, readers unfamiliar with these concepts may reference a book entitled "Computer Aided Geometric Design" by G. Farin, published by Academic Press, 1988.

Specifically, with respect to Bézier forms, it should be noted that a degree d Bézier curve is defined by:

$$B(t) = \sum_{i=0}^{d} \binom{d}{i} b_i (1-t)^{d-i} t^i,$$

where $t \in [0,1]$, and the points $b_i$ form the Bézier control polygon. To simplify notation, a Bézier curve is identified by its control polygon represented as the row vector below:

$$B(t) \equiv [b_0, b_1, \ldots, b_d].$$

The derivative of a Bézier degree d curve $[b_0, b_1, \ldots, b_d]$ is the degree d–1 curve set forth below:

$$d[b_1 - b_0, b_2 - b_1, \ldots, b_d - b_{d-1}].$$

The product of a pair of Bézier curves set forth below:

$$[a_0, a_1, \ldots, a_m][b_0, b_1, \ldots, b_n] = [c_0, c_1, \ldots, c_{m+n}]$$

is computed by:

$$c_i = \sum_{j+k=i} \frac{\binom{m}{j}\binom{n}{k}}{\binom{m+n}{i}} a_j b_k, \quad i = 0, \ldots, m+n,$$

where the summation is taken over all j and k that sum to i such that $0 \leq j \leq m$ and $0 \leq k \leq n$.

A degree d Bézier curve $[b_0, b_1, \ldots, b_d]$ can be equivalently represented by a degree d+1 Bézier curve $[c_0, c_1, \ldots, c_{d+1}]$ by degree raising, where:

$$c_i = \left(\frac{i}{d+1}\right) b_{i-1} + \left(\frac{d+1-i}{d+1}\right) b_i,$$

$$i = 0, \ldots, d+1.$$

Now taking into consideration Bézier surfaces, note that a degree d Bézier triangle B(u,v) is defined below (this definition differs slightly from the more symmetric version that makes use of barycentric coordinates discussed in "Computer Aided Geometric Design" by G. Farin):

$$B(u, v) = \sum_{i+j+k=d} \binom{d}{ijk} b_{ijk} (1-u-v)^i u^j v^k,$$

where i, j, and k are non-negative integers that sum to d, $(1-u-v), u, v \in [0,1]$, and $$\binom{d}{ijk}$$

is the trinomial coefficient $$\frac{d!}{i!j!k!},$$

and $b_{ijk}$ are a triangular array of control points called the Bézier control net. A degree 3 (cubic) Bézier triangle and its control net are illustrated in FIG. 3.

The derivative of a degree d Bézier triangle with respect to a parametric direction w, with coordinates $(w_u, w_v)$, is a degree d–1 Bézier triangle $B^w$ with control points:

$$(-w_u - w_v) b_{i+1,j,k} + w_u b_{i,j+1,k} + w_v b_{i,j,k+1},$$

where i+j+k=d−1.

The edges of a degree d of Bézier triangle B are degree d Bézier curves. For example, the edge corresponding to v=0 is the Bézier curve [$b_{d,0,0}$, $b_{d-1,1,0}$, ... $b_{0,d,0}$]. Similarly, the derivatives along the edge of a Bézier triangle are also Bézier curves. For example, the derivative in the u direction along the edge v=0 is defined by the following Bézier curve:

$$B^u = d[b_{d-1,1,0} - b_{d,0,0}, \ldots, b_{0,d,0} - b_{1,d-1,0}].$$

Similarly, the derivative in the v direction along the edge v=0 is defined by the following Bézier curve:

$$B^v = d[b_{d-1,0,1} - b_{d,0,0}, \ldots, b_{0,d-1,1} - b_{1,d-1,0}].$$

Since differentiation is linear, all other derivatives corresponding to the edge v=0 can be found as linear combinations of $B^u$ and $B^v$. Thus, $B^u$ and $B^v$ span the tangent plane of B, along the edge where v=0. In geometric modeling, this is the key to joining patches smoothly together.

Now addressing the $G^1$ continuity of Bézier triangles, it should be noted that a surface is considered smooth if, at all points, it has a continuous and well-defined tangent plane. This condition is known as first order geometric continuity and is denoted by $G^1$. For example, let P and P' be a pair of Bézier triangles that share a common boundary curve. Let u represent the parametric direction corresponding to the pre-image of the common boundary curve. Let t and t' be a pair of parametric directions pointing into the domains of P and P', relative to the common edge. Patches P and P' meet with $G^1$ continuity, if an only if, there exist functions $\phi$, $\rho$, and $\tau$, such that at all points along an edge of P and P', the following equations hold:

P=P'    1.

$\phi P^u = \rho P^t + \tau P^{t'}$    2.

$\rho\tau > 0$    3.

$P^v \times P^t \neq \vec{0}$    4.

Condition 1 provides that P and P' share a common boundary curve. This condition, also known as $C^0$ or $G^0$ continuity, is satisfied only if the control points of P and P' corresponding to the common boundary curve are identical. Condition 2 indicates that derivatives of P and P' at all points of the common boundary curves are linearly dependent and hence span a common tangent plane. Condition 3 ensures that P and P' lie on opposite sides of the common boundary curve. Condition 4 requires that P and P' be non-degenerate along the common boundary curve. If functions $\phi$, $\rho$, and $\tau$ are constant, P and P' meet with parametric continuity denoted by $C^1$.

Expanding on additional background information, it should be noted that box splines are a type of multivariate spline function. In the bivariate setting, a box spline is of the form:

$$S^\alpha(u, v) = \sum_{i,j \in Z^2} d_{ij} N^\alpha(u - i, v - j),$$

where the $d_{ij}$ are a rectangular array of control points, and $N^\alpha$ is a locally supported, piecewise, polynomial, basis function identified by the tuple of positive integers $\alpha$. The length of $\alpha$ indicates some number of grid directions over which the box spline is defined. The value of each element of $\alpha$ represents the number of unit pulse convolutions in each of the directions needed to generate the box spline.

One such prior art spline technique is a four directional box spline $N^{1111}$. This box spline is piecewise, quadratic, and meets with parametric continuity $C^1$. A collection of scalar values (×1/16) representing the basis function $N^{1111}$ in triangular Bézier form is shown in FIG. 4. For further discussion on how to compute the Bézier form of box splines, reference C. Chui and J. J. Lai, "Algorithms for Generating b-nets and Graphically Displaying Spline Surfaces on Three- and Four-Directional Meshes," *Computer Aided Geometric Design*, vol. 8, pp. 479–93, 1991.

The Bézier form of a box spline basis function implies a geometric construction for the Bézier control nets of the surface. In the case of the box spline $N^{1111}$, four quadratic Bézier triangles are constructed corresponding to each vertex of the box spline control mesh. The control points of these patches are computed by taking a succession of midpoints as illustrated in FIGS. 4 and 5.

Having discussed some basic techniques used in geometric modeling, known to those skilled in the art, it should be recognized that modeling smooth free-form shapes using B-splines is severely limited by the requirement that the control mesh have a regular rectangular structure. To overcome this difficulty, methods for generating smooth surfaces over irregular meshes have been developed. However, as yet, none of these methods has matched the efficiency and elegance achieved by B-splines.

Over the years, several techniques for generating B-spline like surfaces over irregular control meshes have been proposed and implemented. In the late 1970's, Doo & Sabian (see D. Doo, "A subdivision algorithm for smoothing down irregular shaped polyhedrons," In *Proceedings on Interactive Techniques in Computer Aided Design*, pages 157–165, Bologna, 1978) and Catmull & Clark (see E. Catmull and J. Clark, "Recursively generated B-spline surfaces on arbitrary topological meshes," *Computer Aided Design*, 10(6):350–355, 1978) proposed recursive subdivision surfaces.

These techniques generate smooth surfaces by repeatedly subdividing, or refining an irregular control mesh to create a new mesh with more vertices, faces and edges than the original. At its limit, the refined control mesh converges to a smooth surface (see D. Doo and M. Sabin, "Behavior of recursive division surfaces near extraordinary points. *Computer Aided Design*, 10(6):356–360, 1978. However, subdivision surfaces cannot be easily analyzed, i.e., they cannot be described in closed form. This complicates analysis of these surfaces as well as analysis of subsequent modeling techniques that deal with them.

Others have proposed parametric, patch-based, spline modeling techniques for approximating irregular control meshes. Chiyokura & Kimura (see H. Chiyokura and F. Kimura, "Design of solids with free-form surfaces," *Computer Graphic*, 17(3):289–298, 1983) developed a scheme based on Gregory patches that are easy to join together smoothly, but contain singularities at patch vertices.

Van Wijk and others (see, T. N. T. Goodman, "Closed biquadratic surfaces," *Constructive Approximation*, 7(2):149–160, 1991; S. L. Lee and A. A. Majid, "Closed smooth piecewise bicubic surfaces," *ACM Transactions on Graphics*, 10(4):342–365, 1991; and J. van Wijk, "Bicubic patches for approximating non-rectangular control-point meshes," *Computer Aided Geometric Design*, 3(1):1–13, 1986) have presented techniques that approximate a restricted class (where the number of edges surrounding a face or vertex is constrained) of closed polyhedra with bicubic patches.

Other techniques that approximate restricted meshes with parametric surface patches have been proposed by C. Loop and T. DeRose, (see C. Loop and T. DeRose, "Generalized B-spline Surfaces of arbitrary topology," *Computer Graphics*, 24(4):347–356, 1990) and J. Peters (see J. Peters, "Smooth interpolation of a mesh of curves," *Constructive Approximation*, 7:221–246, 1991).

The inventor, himself, C. Loop, has proposed (see C. Loop, "Generalized B-spline Surfaces of Arbitrary Topological Type," *PhD theseis*, university of Washington, 1992) an unrestricted control mesh approximated with n-sided parametric S-patches (see C. Loop and T. DeRose, "A multisided generalization of Bézier surface," *ACM Transactions on Graphics*, 8(3):204–234, Jul. 1989). Although S-patches have many desirable mathematical properties, manipulating them may require excessive amounts of time and storage space as the number of sides increases.

More recently, Bajaj & Ihm (see C. Bajaj and I. Ihm, "Smoothing polyhedra using implicit algebraic splines," *Computer Graphics*, 26(2):79–88, 1992) have proposed a technique for interpolating an irregular triangular mesh based on algebraic surfaces. While the degree of these surfaces is low (cubic), there is significant overhead in computing coefficients and rendering.

Thus, there is an ongoing need for improved modeling techniques for generating aesthetically pleasing and realistic images, both effectively and efficiently, to satisfy the growing demands in the computer graphics field.

SUMMARY OF THE INVENTION

The present invention is directed to a new system and method for generating smooth surfaces over irregular meshes. The primary advantage of the inventive technique over prior techniques lies in a low degree parametric polynomial representation. Since the spline surface constructed is of degree 3 (as opposed to 6 for bicubic surfaces), techniques for surface-surface or ray-surface intersection are faster and more robust. The method is simple to implement, executes quickly, and generates aesthetically pleasing shapes.

This spline technique of the present invention is based on a type of box spline. As described above, box splines, like B-splines, are local piecewise polynomial approximations of rectangular control meshes (e.g. polygons). The spline surface method in accordance with the present invention is a generalization of quadratic $C^1$ box splines to irregular control meshes. The resulting surface is a collection of degree 2 and 3 triangular Bézier patches.

The present modeling method comprises a series of geometric constructions, starting with a user defined control mesh and resulting in a triangular Bézier patch representation of a surface. These constructions are all local averaging procedures. This makes the method of the present invention simple to implement and potentially very fast. Since averaging is an affine process, the relationship of the spline surface to its defining control mesh is invariant under affine transformations. Additionally, with an appropriate choice of free parameters, the modeling technique is capable of generating a surface that lies in the convex hull of its control mesh.

It should be recognized that by approximating irregular control meshes, surfaces can be constructed in more general and complex ways than with B-splines. Such control meshes may be closed or may have a boundary. Unlike B-splines, closed meshes with a spherical topology are approximated without degenerate points. Meshes with boundaries are also easily and neatly approximated near the boundaries. This property can be used to introduce controllable creases on a surface.

In accordance with the present invention, a user defined input mesh $M^0$ is initially simplified by isolating irregularities and constraining geometry. First, the mesh $M^0$ is subjected to a general refinement step, whereby a new mesh $M^1$ is constructed, which in turn, is subjected to a constrained refinement step, whereby another new mesh $M^2$ is constructed. After the general and constrained refinement steps, the mesh $M^2$ is broken up into a set of "quad-nets" corresponding to each of its vertices. Finally, these quad nets are used as local geometry, over which, 4 cubic Bézier triangles are constructed.

These as well as other features of the invention will become apparent from the detailed description which follows, considered together with the appended drawings.

BRIEF DESCRIPTION OF THE DRAWINGS

A preferred embodiment of the system and method of the present invention is illustrated in and by the following drawings in which like reference numerals indicate like parts and in which.

DETAILED DESCRIPTION OF THE PREFERRED EMBODIMENTS

The detailed description that follows is presented largely in terms of algorithms and symbolic representations of operations on data bits and data structures within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulation of physical quantities. Usually, though necessarily, these quantities take the form of electrical or magnetic signals capable of being stored, transferred, combined, compared, and otherwise manipulated. It is convenient at times, namely for reasons of common usage, to refer to these signals as bits, values, elements, symbols, characters, terms, numbers, or the like. It should be recognized, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are entirely machine operations.

Machines used for performing the operations of the present invention include general purpose digital computers or other similar devices. In all cases, the distinction between the method operations in operating a computer and the method of computation itself should be recognized. The present invention relates to method steps for operating a computer in processing electrical or other (e.g., mechanical) physical signals to generate other desired physical signals.

The present invention also relates to a system for performing these operations. This system may be specially constructed for the required purposes, or it may comprise a general purpose computer as selectively activated or reconfigured by a computer program stored in the computer. The algorithms presented herein are not inherently related to any particular computer or other apparatus. In particular, various general purpose machines may be used with programs written in accordance with the disclosure herein, or it may prove more convenient to construct a more specialized system to perform the required method steps. The required structure for a variety of these machines will become apparent from the description given below.

Figure 1:
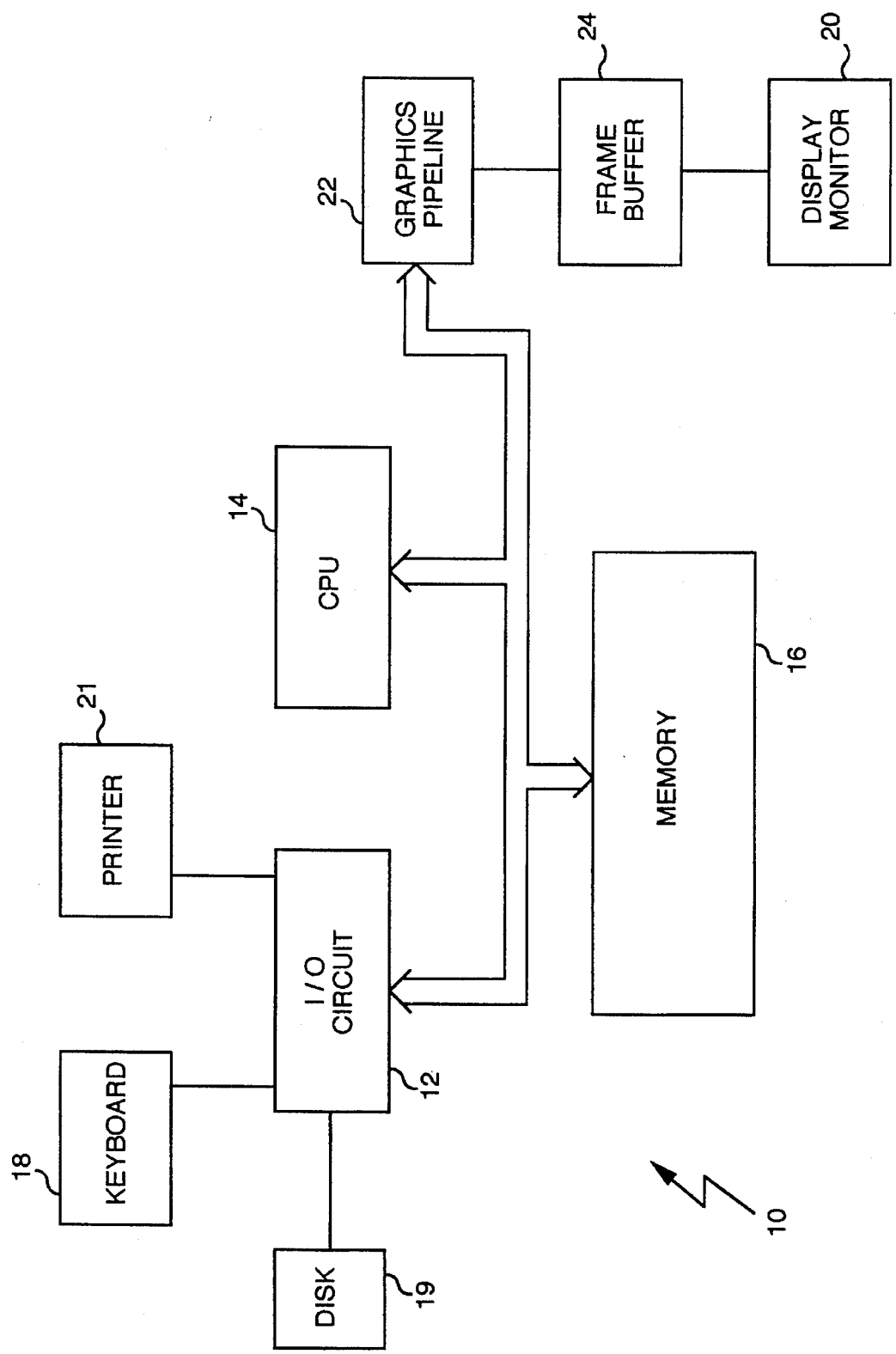
FIG. 1 is a block diagram of an example computer system containing computer graphics capabilities configured to generate smooth low degree polynomial spline surfaces over irregular meshes.

FIG. 1 illustrates a typical computer-based system for generating computer graphic images in accordance with one embodiment of the present invention. Shown there is a computer system 10, comprising an input/output (I/O) circuit 12 used to communicate information in appropriately structured form to and from the other parts of the computer system 10. Also shown, as part of the computer system 10, is the central processing unit (CPU) 14 and memory 16. The central processing unit 14 and memory 16 are typically found in all general as well as special purpose computers. In fact, the elements contained within the computer system 10 are intended to be representative of machines manufactured by Apple Computer Co., Cupertino, Calif. Other computers having similar capabilities may also be adapted to perform the operations described below.

Also illustrated in FIG. 1 is an input device 18, shown in typical embodiment as a keyboard and mouse type controller. It should be understood, however, that the input device may alternatively be a card reader, magnetic or paper tape reader, or other well known input device (including, of course another computer). The computer system also comprises a disk 19 and printer 21.

A mass memory device 16 is coupled to the I/O circuit 12 and provides additional storage capability for the computer system 10. The mass memory device 16 preferably comprises read only memory (ROM) and random access memory (RAM). The mass memory device 16 may include other graphics or like programs and may take the form of a magnetic or paper tape reader or other well known device. It will be appreciated that the data stored within the mass memory 16, may, in appropriate cases, be incorporated in standard fashion into the computer system 10 as part of memory 16.

In addition, a display monitor 20 is illustrated which is used to display the images generated by the method of the present invention. Such a display monitor 20 may take the form of any of several varieties of CRT displays. A cursor control may be used to select command modes and edit graphic data, such as for example a particular image, and to provide a more convenient means to input information into the computer system 10.

Major graphics programs typically used for generating images are stored in the memory 16 and implemented through a graphics pipeline 22 on the display monitor 20 via a frame buffer 24. For example, a video destination bitmap may be stored in the memory 16. The destination bitmap represents the video memory for the display monitor 20. Each bit in the destination bitmap corresponds to the upper left coordinate of a corresponding pixel on the display monitor 20. Thus, the destination bitmap can be described as a two dimensional array of points having known coordinates. Of course, in the present case, where the display monitor 20 is used in conjunction with a low raster output device such as the printer 21, the contents of the bitmap would be the resulting bitmap and would represent the data points to be displayed by the particular low resolution raster output device.

Memory 16 may also include system programs which represent a variety of sequences of instructions for execution by the CPU 14. For example, control programs such as the interpreter, scan converter, disk operating systems, or the like may be stored within this memory 16.

Figure 2:
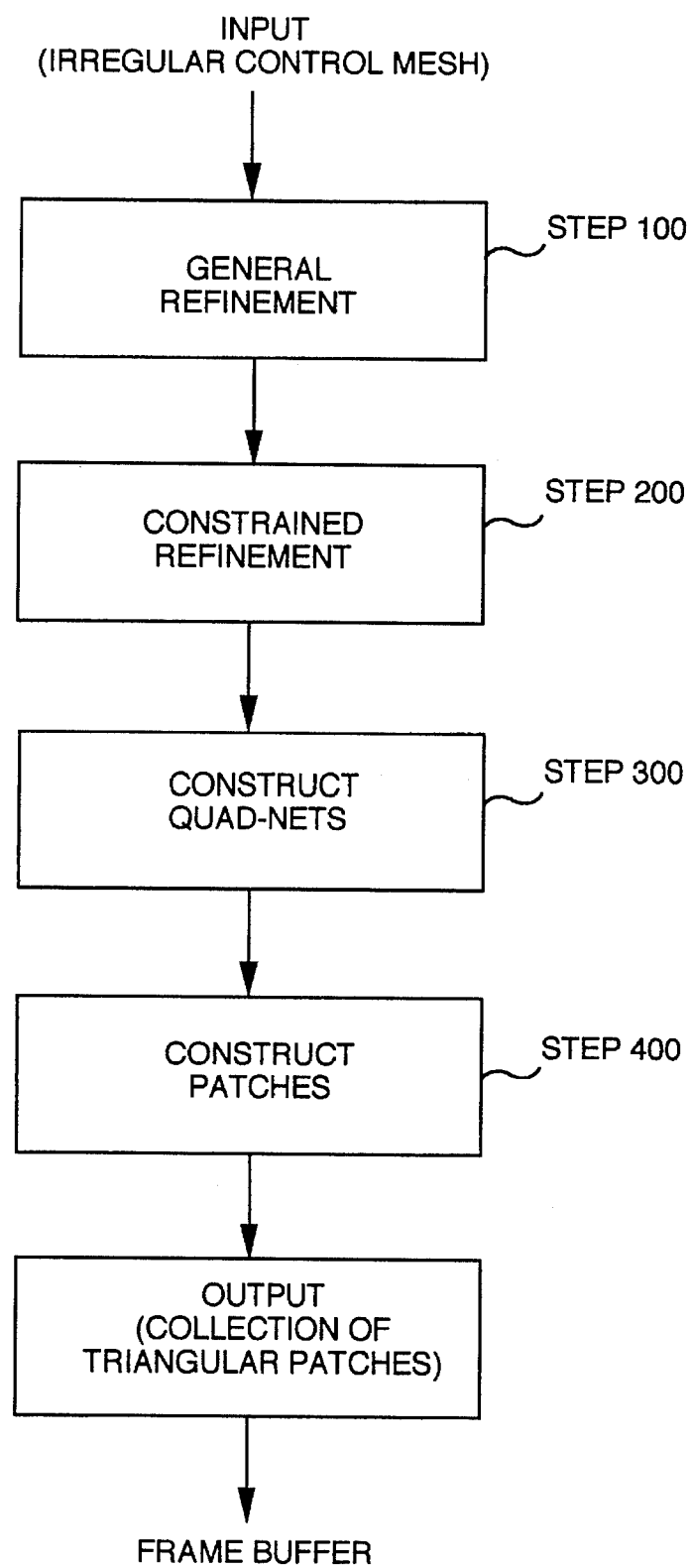
FIG. 2 is a graphics pipeline diagram of the sequence of steps involved in the method for generating smooth low degree polynomial spline surfaces over irregular meshes.
Figure 3:
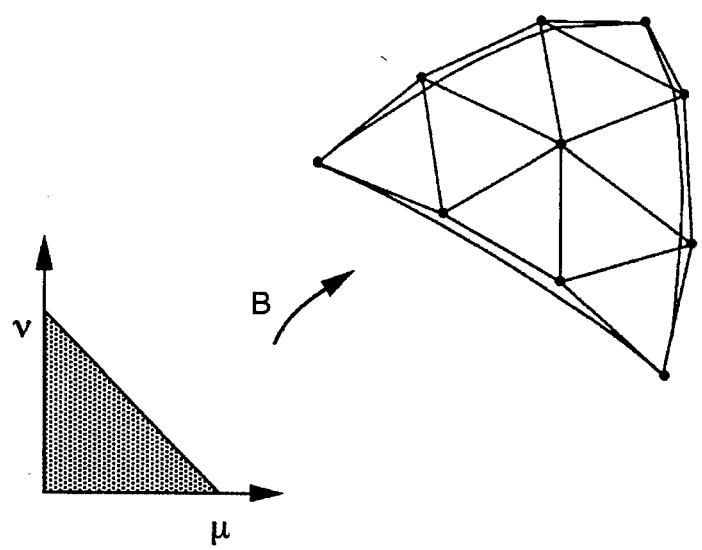
FIG. 3 is a diagram of a cubic Bézier triangle.
Figure 4:
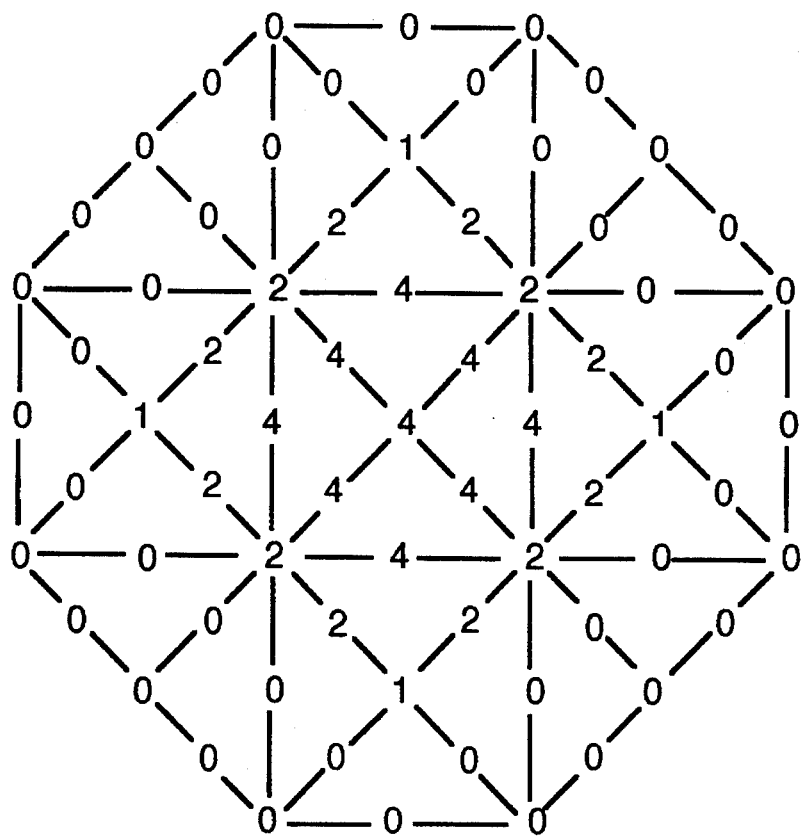
FIG. 4 is a diagram of the quadratic triangular Bézier representation of a box spline $N^{1111}$.
Figure 5:
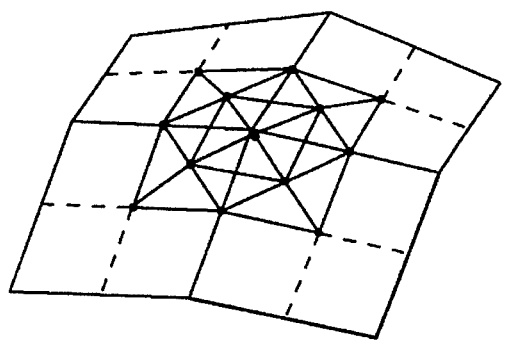
FIG. 5 is an illustration of the construction of four quadratic Bézier triangles corresponding to a control mesh vertex.

Having described in detail the general system configuration, the process, and terminology of the method and system of the present invention, the specific operations of the graphics pipeline 22 are now described in further detail. Referring to FIG. 2, a block diagram illustrating the sequence of steps involved in the graphics pipeline 22 for generating smooth, low degree, polynomial spline surfaces over irregular meshes is shown.

Specifically, the present technique approximates an irregular control mesh with a smooth spline surface that consists of degree 2 and 3 triangular Bézier patches. Since the patches representing the spline surface are of low polynomial degree, procedures for ray-tracing, surface-surface intersection, or rendering are faster and more efficient than existing parametric surface schemes. The present technique is simple and efficient, and generates aesthetically pleasing shapes.

The computer system 10, in particular, the graphics pipeline 22, takes as input a user-defined control mesh $M^0$. Note that a control mesh is preferably a collection of vertices, edges, and faces (not necessarily planar) that may intuitively be considered a polygonal surface, which may or may not be closed. In more technical terms, a control mesh is defined as a tessellated, oriented, 2-manifold (possibly with boundary) mesh. Note that the term order is used to denote the number of faces incident on a vertex, or the number of vertices that make up a face.

In accordance with the present invention, the input mesh $M^0$ is initially simplified by isolating irregularities and constraining the geometry. First, the mesh $M^0$ undergoes a general refinement step 100 that constructs a new mesh $M^1$. Second, the new mesh $M^1$ undergoes a constrained refinement step 200 to produce another new mesh $M^2$. After the general and constrained refinement steps 100, 200, the mesh $M^2$ is broken up into a set of "quadnets" corresponding to each of its vertices in a third step 300. Finally in a fourth step 400, these quad nets are used as local geometry, over which, 4 cubic Bézier triangles are constructed. Each of these steps 100, 200, 300 and 400 is treated in greater detail below.

Recognizing that during the general refinement stage 100, many possible constructions are possible and valid, the general refinement step 100 takes as input any user-defined control mesh $M^0$ or polygon surface and constructs a new mesh $M^1$ of more predictable structure.

Figure 6:
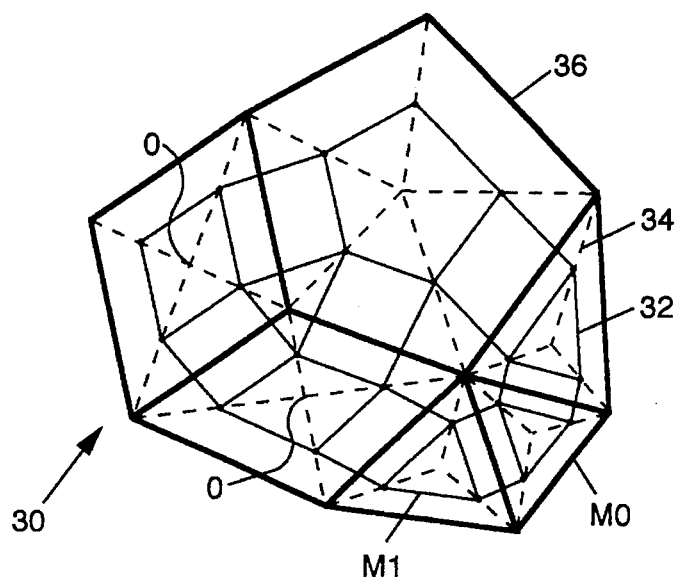
FIG. 6 is an illustration of the application of the general refinement process of the present invention on an exemplary mesh.

The vertices of the new mesh $M^1$ are constructed to correspond to each (vertex, face) pair of mesh $M^0$. For example, take F to be a face of mesh $M^0$, consisting of vertices $\{P_0, P_1, \ldots, P_{n-1}\}$ with a centroid O (the average of the $P_i$s). The point $P_i'$ of new mesh $M^1$ corresponding to ($P_i$, F) is determined as the mid-point of the line-segment $\overline{OP_i}$. The faces of new mesh $M^1$ are constructed to correspond to the vertices, faces and edges of mesh $M^0$. Each order k vertex of mesh $M^0$ generates an order k face belonging to the new mesh $M^1$. Similarly, each order n face of mesh $M^0$ generates an order n face belonging to new mesh $M^1$. Finally, each edge of mesh $M^0$ generates an order 4 face belonging to new mesh $M^1$. This construction is illustrated generally at 30, in FIG. 6, where the vertices of the new mesh $M^1$ indicated at 32 (shown in thin lines), lie at the midpoints of the lines 34 (shown in dashed lines) that connect the vertices and face centroids of the old mesh $M^0$ indicated at 36 (shown in bold lines).

Note that all the (non-boundary) vertices of the new mesh $M^1$ are of order 4 and no two non-4-sided faces share an edge.

In an exemplary embodiment, the general refinement step 100 can be performed using one step of the subdivision surface modeling technique described in D. Doo, "A Subdivision Algorithm for Smoothing Down Irregularly Shaped Polyhedrons," *Proceedings on Interactive Techniques in Computer Aided Design*, pp. 157–165, Bologna, 1978. As noted there, the new vertex $P_i'$ may lie anywhere along $\overline{OP_i}$, not just at the midpoint. The ratio where $P_i$ divides $\overline{OP_i}$ may be used as a shape parameter. The closer the $P_i'$'s are to O, the more "rounded" the surfaces appear. If this ratio is positive, the new mesh $M^1$ lies contained in the convex hull of mesh $M^0$.

Constructions for treating mesh boundaries in a reasonable way, including special consideration of vertices and edges that belong to the boundary of mesh $M^0$, are now described. As a side effect, this treatment provides for introduction of creases into a surface. The method modifies the general refinement step 100 so that new faces are added to new mesh $M^1$, which correspond to vertices and edges belonging to the boundary of mesh $M^0$. This construction has the property whereby the boundary of the resulting spline surface becomes the quadratic B-spline curve corresponding to the boundary of old mesh $M^0$. Two meshes that share a common boundary, therefore, meet continuously ($G^0$), but not necessarily smoothly ($G^1$). This fact may be used to model surfaces with creases.

There are two cases to consider, faces of new mesh $M^1$ constructed to correspond to boundary edges of mesh $M^0$, and faces of new mesh $M^1$ constructed to correspond to boundary vertices of mesh $M^0$.

When constructing faces of mesh $M^1$ to correspond to boundary edges of mesh $M^0$, the vertex pair ($V_0$, $V_1$) is taken to be a boundary edge of mesh $M^0$ belonging to face F. $P_0$ and $P_1$ are defined to be the vertices of mesh $M^1$ constructed during step 100 of the sequence, corresponding to the vertex-face pairs ($V_0$,F) and ($V_1$,F), respectively. Two new vertices $Q_0$ and $Q_1$, and one new face $\{P_0, P_1, Q_1, Q_0\}$ are added to new mesh $M^1$. The points $Q_0$ and $Q_1$ are determined by the following equations:

$$Q_0 = \frac{3}{2} V_0 + \frac{1}{2} V_1 - P_0,$$

$$Q_1 = \frac{1}{2} V_0 + \frac{3}{2} V_1 - P_1.$$

When constructing faces of new mesh $M^1$ to correspond to boundary vertices of mesh $M^0$, V is taken to be a vertex on the boundary of mesh $M^0$. Note that k is defined to be the number of faces incident on V. Further, $P_0, P_1, \ldots, P_{k+1}$ are defined to be vertices of new mesh $M^1$, where $P_1, \ldots, P_k$ are the vertices corresponding to V constructed during step 100 of the sequence, and $P_0$ and $P_{k+1}$ are determined by construction of the boundary edge described immediately above.

There are namely two cases, when k equals (=) 1 and when k is greater than (>) 1. When k=1, the vertex V is a corner of mesh $M^0$. This vertex is treated as a discontinuity in the boundary B-spline curve so that the vertex behaves like a corner of the spline surface. A new face $\{P_0, P_1, P_2, P_3\}$ is added to new mesh $M^1$ where:

$$P_3 = 4V - P_0 - P_1 - P_2.$$

When k>1, a new order n=2 k face $\{P_0, \ldots, P_{n-1}\}$ is added to new mesh $M^1$ where:

$$P_i = 2(uQ_0 + (1-u)Q_1) - P_{n-i+1}, i = k+2, \ldots, n-1,$$

with:

$$Q_0 = \frac{1}{2} P_0 + \frac{1}{2} P_1, Q_1 = \frac{1}{2} P_k + \frac{1}{2} P_{k+1},$$

and $$u = \frac{1}{2} \left( \cos \frac{2\pi i}{n} + \tan \frac{\pi}{n} \sin \frac{2\pi i}{n} \right).$$

Moving now to the second step 200 of the sequence, it should be noted that the second step 200 of the modeling technique is very similar to the first, in that another new mesh $M^2$ is constructed as a refinement of the output from mesh $M^1$ resulting from the previous step 100. Step 200 is termed "constrained refinement" since the vertices of mesh $M^2$ are constructed according to a very special refinement rule. The mesh $M^2$ is constructed such that all of its (non-boundary) vertices are of order 4, where at least three of the faces incident on a vertex, are 4-sided, and all non-4-sided faces are planar.

The following theorem is the basis to constructing the planar faces:

Theorem 1

Let $P_0, \ldots, P_{n-1} \in \Re$ be a set of points in general position. The set of points:

$$Q_i = \frac{1}{n} \sum_{j=0}^{n-1} P_j \left( 1 + \cos \frac{2\pi(j-i)}{n} \right) \qquad (1)$$

-continued $i = 0, \ldots, n-1,$ satisify:

$$\frac{1}{2} Q_{i-1} + \frac{1}{2} Q_{i+1} = \left(1 - \cos \frac{2\pi}{n}\right) O + \cos \frac{2\pi}{n} Q_i, \quad (2)$$

where:

$$O = \frac{1}{n} \sum_{j=0}^{n-1} P_j, \quad (3)$$

and are therefore co-planar.

Each vertex of new mesh $M^2$ corresponds to a (vertex, face) pair of mesh $M^1$. Equation (1) is used to construct n new vertices corresponding to each order n face of mesh $M^1$. The faces of new mesh $M^2$ correspond to the vertices, edges, and faces of mesh $M^1$ just as in step 1 of the sequence. In this constrained refinement procedure, the faces of new mesh $M^2$ corresponding to the faces of mesh $M^1$ are planar by Theorem 1. The need for planar faces will become apparent in the next section.

Figure 7:
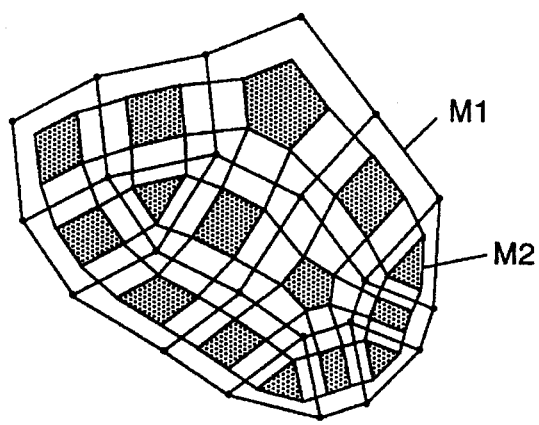
FIG. 7 is an illustration of the application of the constrained refinement process of the present invention on the exemplary mesh of FIG. 6.

FIG. 7 illustrates the constrained refinement step 200. No new faces for mesh $M^2$ need be constructed corresponding to vertices and edges belonging to the boundary of mesh $M^1$ (see discussion on treatment of boundaries above).

Figure 8:
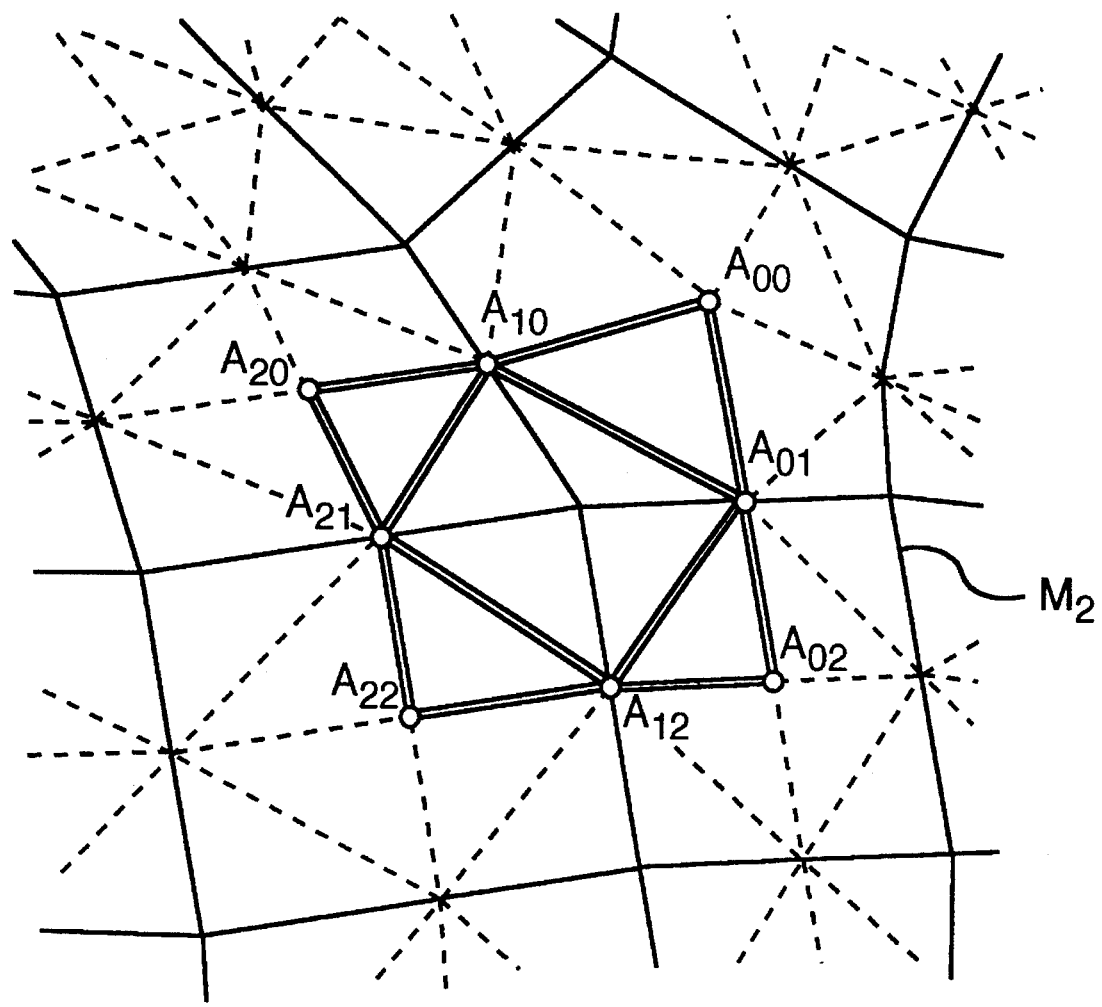
FIG. 8 is an illustration of the application of the quad-net construction process of the present invention on the exemplary mesh of FIG. 7.

In the third step 300 of the present modeling technique, quad-nets corresponding to the (non-boundary) vertices of $M^2$ are constructed. The quad-net for a particular vertex A is a collection of 8 points consisting of the mid-points ($A_{10}$, $A_{01}, A_{12}, A_{21}$) of the four edges incident on the vertex, together with the centroids ($A_{20}, A_{00}, A_{02}, A_{22}$) of the four faces incident on the vertex (note that the non-boundary vertices of mesh $M^2$ are all order 4). A quad-net and its labeling scheme is illustrated in FIG. 8.

The purpose of the quad-net is to locally characterize a piece of the surface. This piece of surface is bounded by the four quadratic Bézier curves $[A_{00},A_{10},A_{20}]$, $[A_{20},A_{21},A_{22}]$, $[A_{22},A_{12},A_{02}]$ and $[A_{02},A_{01},A_{00}]$. The endpoint tangents of these curves define surface tangent planes at each corner of a quad-net. By requiring that the non 4-sided faces of $M^2$ be planar, it is clear that the endpoint tangents of all quad-net boundary curves meeting at such a face lies in a common tangent plane. It is also true that quad-net boundary curves meeting at 4-sided faces lie in a common tangent plane since the midpoints of the sides of an arbitrary quadrilateral forms a parallelogram (e.f. theorem 3.4 (see H. Behnke, et al., editors, "*Geometry, Volume II of Fundamentals of Mathematics*", chapter 2, page 41. MIT Press, 1983), and any parallelogram is planar.

By specifying the scalar parameter $c=\cos 2\pi/n$, where n is in the order of the face associated with point $A_{00}$, the relationship of a quad-net to its neighbors is also characterized. Thus, each quad-net, along with its parameter c, completely localizes the surface fitting problem.

Figure 9A:
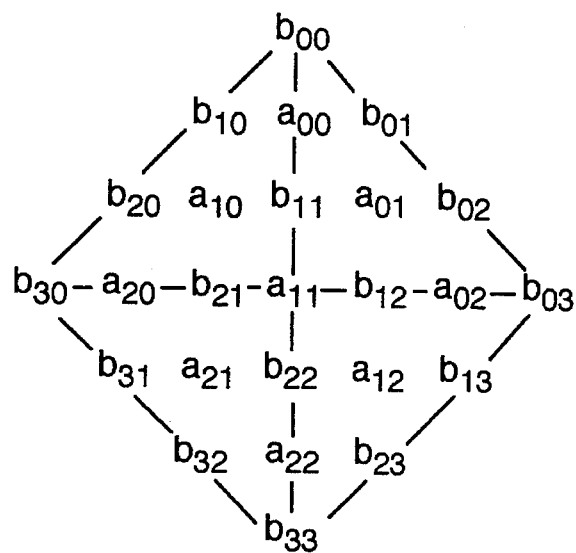
FIGS. 9a and 9b are illustrations of the application of the patch construction process of the present invention on the exemplary mesh of FIG. 8.
Figure 9B:
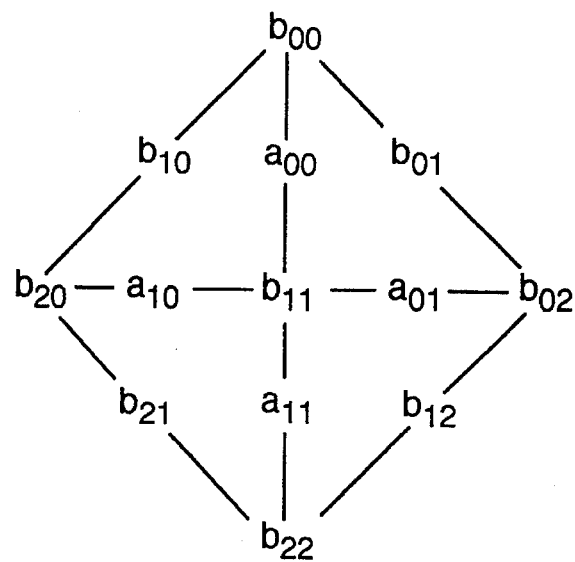

Referring now to FIGS. 9a and 9b, in the fourth and final step 400, parametric patches are constructed that interpolate the information implied by the quad-nets constructed during step 300 of the sequence. A single bi-quadratic patch may seem sufficient to interpolate this data. Unfortunately, a constraint on the position of the central Bézier control point of a bi-quadratic Bézier patch involves all patches that meet at $A_{00}$. Satisfying this constraint is in general not possible (see M. A. Watkins, "Problems in geometric continuity," *Computer Aided Design*, 20(8), 1988). This difficulty can be eliminated in this case by using four triangular patches that form an 'X' with respect to the four boundary curves.

Quadratic triangular patches suffice to interpolate the quad-net boundary data, but do not have enough degrees of freedom to satisfy smoothness constraints across the boundaries interior to a quad-net. By using cubic patches, an additional vector degree of freedom is introduced that can be used to ensure smooth joins between the four triangular patches. The labeling scheme used for the control nets of the four cubic Bézier triangles is shown in FIG. 9a.

Figure 10:
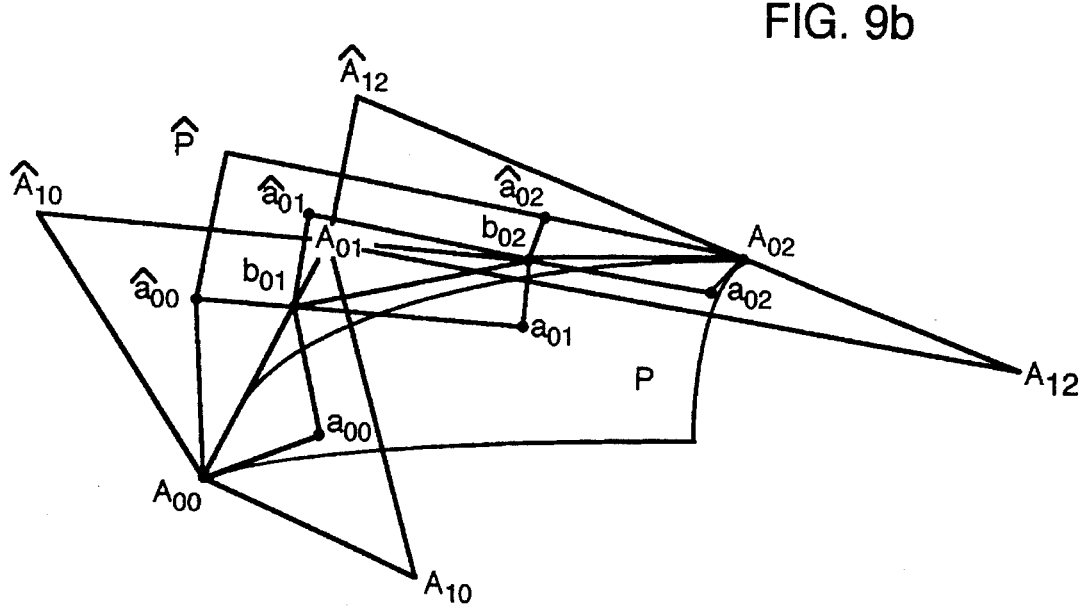
FIG. 10 is an illustration of the control points affecting the $G^1$ join between patches P and P'.

Interpolating the boundary curves of the quad-net is achieved by degree raising (described above) resulting in:

$b_{00} = A_{00}, b_{30} = A_{20},$  $b_{03} = A_{02}, b_{33} = A_{22},$ $b_{10} = \frac{1}{3} A_{00} + \frac{2}{3} A_{10},$  $b_{01} = \frac{1}{3} A_{00} + \frac{2}{3} A_{01},$ $b_{20} = \frac{2}{3} A_{10} + \frac{1}{3} A_{20},$  $b_{02} = \frac{2}{3} A_{01} + \frac{1}{3} A_{02},$ $b_{31} = \frac{1}{3} A_{20} + \frac{2}{3} A_{21},$  $b_{13} = \frac{1}{3} A_{02} + \frac{2}{3} A_{12},$ $b_{32} = \frac{2}{3} A_{21} + \frac{1}{3} A_{22},$  $b_{23} = \frac{2}{3} A_{12} + \frac{1}{3} A_{22}.$ Tangent plane continuity at the quad-net corners is maintained by setting:

$a_{00} = \frac{1}{2} b_{10} + \frac{1}{2} b_{01},$  $a_{20} = \frac{1}{2} b_{20} + \frac{1}{2} b_{31},$ $a_{02} = \frac{1}{2} b_{02} + \frac{1}{2} b_{13},$  $a_{22} = \frac{1}{2} b_{32} + \frac{1}{2} b_{23}.$ To guarantee that the surface is smooth across quad-net boundaries, the points $a_{10}, a_{01}, a_{21}$, and $a_{12}$ are constructed subject to the $G^1$ continuity constraints discussed above. The construction for the point $a_{10}$ is derived as follows. Let two cubic Bézier triangles P and P' share a common quad-net boundary curve all illustrated in FIG. 10, where it is illustrated that the labelling of control points affecting the $G^1$ join between patches P and P'. By construction, the quad-nets satisfy:

$$(1 - c)A_{00} + cA_{01} = \frac{1}{2} A_{10} + \frac{1}{2} A'_{10} \quad (5)$$

and $$A_{02} = \frac{1}{2} A_{12} + \frac{1}{2} A'_{12}. \quad (6)$$

Let u represent a parametric direction along the common boundary. Since $[A_{00},A_{01},A_{02}] \equiv [b_{00},b_{01},b_{02},b_{03}]$ by degree raising, the derivative of patch P with respect to u can be represented by:

$P^u = 2[A_{01} - A_{00}, A_{02} - A_{01}].$

Let t and t' be a pair of parametric directions across the common boundary such that:

$P^t = 3[a_{00} - b_{00}, a_{01} - b_{01}, a_{02} - b_{02}],$ $P'^t = 3[a'_{00} - b_{00}, a'_{01} - b_{01}, a'_{02} - b_{02}].$

Furthermore, let $\phi = [1+c, 1], \rho = [1], \tau = [1].$

Expanding Condition 2 of the definition of $G^1$ continuity leads to:

$(c_0) \frac{2-c}{3} A_{00} + \frac{1+c}{3} A_{01} = \frac{1}{2} a_{00} + \frac{1}{2} a'_{00},$ $(c_1) \frac{1}{6} A_{00} + \frac{4-c}{6} A_{01} + \frac{1+c}{6} A_{02} = \frac{1}{2} a_{01} + \frac{1}{2} a'_{01},$ -continued $$(c_2) \; \frac{1}{3} \; A_{01} + \frac{2}{3} \; A_{02} = \frac{1}{2} \; a_{02} + \frac{1}{2} \; a'_{02},$$

where $(c_0)$, $(c_1)$, and $(c_2)$ represent equalities between the control points of two quadratic Bézier curves. Equalities $(c_0)$ and $(c_2)$ follow directly from Equations (5) and (6). Equality $(c_1)$ is satisfied by constructing $a_{01}$ and $a'_{01}$ appropriately.

The idea is to construct $a_{01}$ and $a'_{01}$ as affine combinations of points belonging to the two adjacent quad-nets. That is:

$$a_{01} = \alpha_0 A_{00} + \alpha_1 A_{01} + \alpha_2 A_{02} + \alpha_3 A_{10} + \alpha_4 A_{12} \quad (7)$$

and symmetrically:

$$a'_{01} = \alpha_0 A_{00} + \alpha_1 A_{01} + \alpha_2 A_{02} + \alpha_3 A'_{10} + \alpha_4 A'_{12}. \quad (8)$$

Substituting Equations (7) and (8) into $(c_1)$, and using Equations (5) and (6) to eliminate $A_{10}$, $A_{20}$, $A'_{10}$, and $A'_{20}$ leads to 3 linear equations in the 5 unknown $\alpha_i$'s. A two parameter family of solutions for the $\alpha_i$'s is:

$$\alpha_0 = \frac{1}{6} - (1-c)t_0,$$

$$\alpha_1 = \frac{4-c}{6} - ct_0,$$

$$\alpha_2 = \frac{1+c}{6} + t_1,$$

$$\alpha_3 = t_0,$$

$$\alpha_4 = t_1.$$

A particular solution with nice properties is found by setting $t_0 = t_1 = \frac{1}{6}$ resulting in:

$$a_{01} = \frac{c}{6} \; A_{00} + \frac{2-c}{3} \; A_{01} + \frac{c}{6} \; A_{02} + \frac{1}{6} \; A_{10} + \frac{1}{6} \; A_{12}. \quad (9)$$

This solution is symmetric with respect to the quad-net, and leads to cubic patches that are equivalent to degree raised quadratic patches when $c=0$ (when the face associated with $A_{00}$ is order 4). Additionally, the coefficients in Equation (9) are convex, except when the face associated with $A_{00}$ is order 3. The point $a_{10}$ may always be found as a convex combination by appropriate choice of $t_0$ and $t_1$.

The constructions for the other points follow by symmetry. The results are:

$$a_{01} = \frac{c}{6} \; A_{00} + \frac{2-c}{3} \; A_{01} + \frac{c}{6} \; A_{02} + \frac{1}{6} \; A_{10} + \frac{1}{6} \; A_{12},$$

$$a_{10} = \frac{c}{6} \; A_{00} + \frac{2-c}{3} \; A_{10} + \frac{c}{6} \; A_{20} + \frac{1}{6} \; A_{01} + \frac{1}{6} \; A_{21},$$

$$a_{21} = \frac{2}{3} \; A_{21} + \frac{1}{6} \; A_{10} + \frac{1}{6} \; A_{12},$$

$$a_{12} = \frac{2}{3} \; A_{12} + \frac{1}{6} \; A_{01} + \frac{1}{6} \; A_{21}.$$

The remaining Bézier control points are constructed to ensure a smooth join between the four patches as follows:

$$b_{11} = \frac{1}{2} \; a_{10} + \frac{1}{2} \; a_{01}, \quad b_{12} = \frac{1}{2} \; a_{01} + \frac{1}{2} \; a_{12},$$

$$b_{21} = \frac{1}{2} \; a_{10} + \frac{1}{2} \; a_{21}, \quad b_{22} = \frac{1}{2} \; a_{21} + \frac{1}{2} \; a_{12},$$

and

-continued $$a_{11} = \frac{1}{2} \; b_{11} + \frac{1}{2} \; b_{22}.$$

A property of patch construction is that when the face associated with $A_{00}$ is order 4 (and hence $c=0$), the cubic patches are equivalent to degree raised quadratic patches. Due to the special structure of mesh $M^2$, this property of patch construction is true for at least ¾ of the quad-nets. As an optimization, one may compute the quadratic Bézier control nets directly for the quad-nets exhibiting this property.

FIG. 9b illustrates control nets of four example quadratic Bézier triangles. The following formulas may be used to compute the points labeled on the quad-net in FIG. 9b.

$$b_{00} = A_{00}, \quad b_{20} = A_{20}, \quad b_{02} = A_{02}, \quad b_{22} = A_{22},$$

$$b_{10} = A_{10}, \quad b_{01} = A_{01}, \quad b_{21} = A_{21}, \quad b_{12} = A_{12},$$

$$a_{00} = \frac{1}{2} \; b_{10} + \frac{1}{2} \; b_{01}, \quad a_{10} = \frac{1}{2} \; b_{10} + \frac{1}{2} \; b_{21},$$

$$a_{01} = \frac{1}{2} \; b_{01} + \frac{1}{2} \; b_{12}, \quad a_{11} = \frac{1}{2} \; b_{21} + \frac{1}{2} \; b_{12},$$

and $$b_{11} = \frac{1}{2} \; a_{00} + \frac{1}{2} \; a_{11}.$$

This construction equates to the construction of the Bézier control net for a quadratic box spline surface $N^{1111}$. This implies that the quadratic box splines are generalized by this spline surface method.

The collection of cubic [and quadratic] Bézier triangles constructed in this step are output from the final step in the spline method.

In conclusion the following points bear consideration, the method of the present invention approximates an irregular control mesh with a smooth spline surface that consists of degree 2 and 3 triangular Bézier patches. Since the patches representing the spline surface are of such low polynomial degree, methods for ray-tracing, surface-surface intersection, or rendering is faster and more robust than for existing parametric surface schemes. The method is simple and efficient and generates aesthetically pleasing shapes.

Since the meshes $M^0$, $M^1$ and $M^2$ are approximations of the spline surface, these meshes may be used in selecting different levels of detail, in cases where it is not practical to use the actual surface. For example, an application may display mesh $M^2$ during an interactive modeling session, when computing and displaying the surface patches would be slower than the rate of updating the display.

Although the present invention has been described with reference to FIGS. 1–10, it should be understood that the figures are for illustration only and should not be taken as limitations upon the invention. It is contemplated that many changes and modifications may be made, by one of ordinary skill in the art, to the process and arrangement of steps of the process of the invention without departing from the spirit and scope of the invention as disclosed above.

What is claimed is:

1. A computer implemented process for generating smooth low degree polynomial spline surfaces over irregular meshes to display aesthetically pleasing images on a display monitor, the process comprising:

defining an irregular control mesh to represent a polygonal surface;

constructing a control mesh of predictable structure, such that vertices, faces and edges of said control mesh of predictable structure are generated using vertices, faces and edges of said irregular control mesh;

refining the control mesh of predictable structure to construct a refined mesh with vertices and at least one non-4-sided face according to a predetermined rule, said refined mesh vertices including a non-boundary vertex which is of order 4 with three incident 4-sided faces and an incident non-4-sided face which is planar;

breaking the refined mesh into a plurality of quad-nets corresponding to selected vertices of said refined mesh, at least one of said quad-nets corresponding to the non-boundary vertex; and constructing four triangular patches using said quad-nets as a local geometry.

2. The computer implemented process as defined in claim 1, wherein said step of defining an irregular control mesh to represent a polygonal surface further comprises the steps of:

specifying a plurality of vertices of the polygonal surface;

specifying a plurality of edges between the specified vertices of the polygonal surface; and specifying a plurality of faces between the specified edges of the polygonal surface.

3. The computer implemented process as defined in claim 1, wherein said step of constructing a control mesh of predictable structure further comprises the step of constructing the control mesh of predictable structure such that the vertices of the control mesh of predictable structure lie at midpoints of lines connecting said vertices of the irregular control mesh and centroids of the faces of the irregular control mesh.

4. The computer implemented process as defined in claim 1, wherein said step of constructing a control mesh of predictable structure generates an order 4 face in the control mesh of predictable structure for each edge of the irregular control mesh.

5. The computer implemented process as defined in claim 1, wherein said step of constructing a control mesh of predictable structure further comprises the steps of:

determining the centroid for each face of the irregular control mesh;

establishing a plurality of line segments between the centroid of a face of the irregular control mesh and the vertices of the same face of the irregular control mesh; and constructing vertices of the control mesh of predictable structure by selecting points along the line segments that are a predetermined proportional distance of the line segment from the centroid.

6. The computer implemented process as defined in claim 5, wherein the predetermined proportional distance is half.

7. The computer implemented process as defined in claim 5, wherein the step of constructing a control mesh of predictable structure adds two new vertices and one new face for each boundary of the irregular control mesh.

8. The computer implemented process as defined in claim 7, wherein the two new vertices $Q_0$ and $Q_1$, are defined by:

$$Q_0 = \frac{3}{2} V_0 + \frac{1}{2} V_1 - P_0, \text{ and}$$

$$Q_1 = \frac{1}{2} V_0 + \frac{3}{2} V_1 - P_1$$

where the vertex pair $(V_0, V_1)$ is a boundary edge of the irregular control mesh, and $P_0$ and $P_1$ are the vertices of the control mesh of predictable structure corresponding to the vertex pairs, and wherein the new face is $\{P_0, P_1, Q_1, Q_0\}$.

9. The computer implemented process as defined in claim 5, wherein the step of constructing a control mesh of predictable structure constructs the faces of the control mesh of predictable structure to correspond to the boundary vertices of the irregular control mesh.

10. The computer implemented process as defined in claim 9, wherein a new face is added for each boundary vertex, V.

11. The computer implemented process as defined in claim 10, wherein a new face $(P_0, P_1, P_2, P_3,)$ added to the control mesh of predictable structure is defined by:

$$P_3 = 4V - P_0 - P_1 - P_2,$$

when k=1, where k is the number of faces incident on vertex V; where $P_0, P_1, \ldots, P_{k+1}$, are vertices of the control mesh of predictable structure; and where $P_1, \ldots, P_k$ are the vertices of the irregular control mesh.

12. The computer implemented process as defined in claim 10, wherein a new order n=2 k face $\{P_0, \ldots, P_{n-1}\}$ is added to the control mesh of predictable structure where:

$$P_i = 2(uQ_0 + (1-u)Q_i) - P_{n-i+1},$$

$$i = k + 2, \ldots, n - 1$$

with $$Q_0 = \frac{1}{2} P_0 + \frac{1}{2} P_1, Q_1 = \frac{1}{2} P_k + \frac{1}{2} P_{k+1}$$

and $$u = \frac{1}{2} \left( \cos \frac{2\pi i}{n} + \tan \frac{\pi}{n} \sin \frac{2\pi i}{n} \right)$$

when k>1, where k is the number of faces incident on vertex V; where $P_0, P_1, \ldots, P_{k+1}$ are vertices of the control mesh of predictable structure; and where $P_1, \ldots, P_k$, are vertices of the irregular control mesh.

13. The computer implemented process as defined in claim 1, wherein the predetermined rule of said step of refining the control mesh of predictable structure and constructing a refined mesh defines all non-boundary vertices of the refined mesh to be of order 4, wherein at least three of the faces incident on a vertex are 4-sided and all non-4-sided faces are planar.

14. The computer implemented process as defined in claim 13, wherein the step of refining the control mesh of predictable structure and constructing a refined mesh further comprises the step of constructing n new vertices of the refined mesh corresponding to each order n face of the control mesh of predictable structure using the equation:

$$Q_i = \frac{1}{n} \sum_{j=0}^{n-1} P_j \left( 1 + \cos \frac{2\pi(j-i)}{n} \right) i = 0, \ldots, n-1 \quad (1)$$

where $P_0, \ldots, P_{n-1} \in \Re$ is a set of points in general position and each vertex of the refined mesh corresponds to a (vertex, face) pair of the control mesh of predictable structure.

15. The computer implemented process as defined in claim 1, wherein said step of breaking the refined mesh into a plurality of quad-nets further includes creating a quad-net for each vertex of the refined mesh, and wherein each quad-net includes eight points including the mid-points of the four edges incident on the vertex and the centroids of the four faces incident on the vertex.

16. The computer implemented process as defined in claim 15, wherein the quad nets are calculated only for the non-boundary vertices.

17. The computer implemented process as defined in claim 1, wherein said step of breaking further comprises the step of:

defining the relationship of a quad-net to its neighbors by specifying the scalar parameter C=cos 2π/n, where n is the order of the face associated with a point $A_{00}$ from four quadratic Bezier curves $[A_{00}, A_{10}, A_{20}]$, $[A_{20}, A_{21}, A_{22}]$, $[A_{22}, A_{12}, A_{02}]$ and $[A_{02}, A_{01}, A_{00}]$ bounding a piece of the polygonal surface.

18. The computer implemented process as defined in claim 1, wherein said four triangular patches are constructed using four cubic Bezier triangles with said quad-nets as a local geometry.

19. The computer implemented process as defined in claim 18, wherein said four cubic Bezier triangles are constructed by creating a Bezier control net defined by:

$$b_{00} = A_{00}, \quad b_{30} = A_{20}, \quad b_{03} = A_{02}, \quad b_{33} = A_{22},$$

$$b_{10} = \frac{1}{3} A_{00} + \frac{2}{3} A_{10}, \quad b_{01} = \frac{1}{3} A_{00} + \frac{2}{3} A_{01},$$

$$b_{20} = \frac{2}{3} A_{10} + \frac{1}{3} A_{20}, \quad b_{02} = \frac{2}{3} A_{01} + \frac{1}{3} A_{02},$$

$$b_{31} = \frac{1}{3} A_{20} + \frac{2}{3} A_{21}, \quad b_{13} = \frac{1}{3} A_{02} + \frac{2}{3} A_{12},$$

$$b_{32} = \frac{2}{3} A_{21} + \frac{1}{3} A_{22}, \quad b_{23} = \frac{2}{3} A_{12} + \frac{1}{3} A_{22}.$$

$$a_{00} = \frac{1}{2} b_{10} + \frac{1}{2} b_{01}, \quad a_{20} = \frac{1}{2} b_{20} + \frac{1}{2} b_{31},$$

$$a_{02} = \frac{1}{2} b_{02} + \frac{1}{2} b_{13}, \quad a_{22} = \frac{1}{2} b_{32} + \frac{1}{2} b_{23}.$$

$$a_{01} = \frac{c}{6} A_{00} + \frac{2-c}{3} A_{01} + \frac{c}{6} A_{02} + \frac{1}{6} A_{10} + \frac{1}{6} A_{12},$$

$$a_{10} = \frac{c}{6} A_{00} + \frac{2-c}{3} A_{10} + \frac{c}{6} A_{20} + \frac{1}{6} A_{01} + \frac{1}{6} A_{21},$$

$$a_{21} = \frac{2}{3} A_{21} + \frac{1}{6} A_{10} + \frac{1}{6} A_{12},$$

$$a_{12} = \frac{2}{3} A_{12} + \frac{1}{6} A_{01} + \frac{1}{6} A_{21}.$$

$$b_{11} = \frac{1}{2} a_{10} + \frac{1}{2} a_{01}, \quad b_{12} = \frac{1}{2} a_{01} + \frac{1}{2} a_{12},$$

$$b_{21} = \frac{1}{2} a_{10} + \frac{1}{2} a_{21}, \quad b_{22} = \frac{1}{2} a_{21} + \frac{1}{2} a_{12},$$

and $$a_{11} = \frac{1}{2} b_{11} + \frac{1}{2} b_{22}.$$

where $A_{00}$, $A_{10}$, $A_{20}$, $A_{21}$, $A_{22}$, $A_{12}$, $A_{02}$ and $A_{01}$ are points of the quad-net.

* * * * *

UNITED STATES PATENT AND TRADEMARK OFFICE
CERTIFICATE OF CORRECTION

PATENT NO. : 5,602,979
DATED : February 11, 1997
INVENTOR(S) : Loop, Charles

It is certified that error appears in the above-indentified patent and that said Letters Patent is hereby corrected as shown below:

In Claim 14, at column 16, line 52, delete "$\Re$ is a set of points"

and insert therefor - - $\Re^3$ is a set of points - -.

In Claim 19, column 17, line 21, delete "$b_{31} - \frac{1}{3}$"

and insert therefor - - $b_{31} = \frac{1}{3}$ - -.

Signed and Sealed this

Second Day of November, 1999

Attest:

Attesting Officer

Q. TODD DICKINSON

Acting Commissioner of Patents and Trademarks